United States Patent

Jager et al.

[11] Patent Number: 5,916,831
[45] Date of Patent: Jun. 29, 1999

[54] CARBURETOR

[75] Inventors: Dennis John Jager, Keighley, United Kingdom; Steven John Charlton, Columbus, Ind.; John Slowley, Bristol, United Kingdom

[73] Assignee: British Gas plc, United Kingdom

[21] Appl. No.: 08/646,305
[22] PCT Filed: Nov. 17, 1994
[86] PCT No.: PCT/GB94/02536
    § 371 Date: Mar. 14, 1997
    § 102(e) Date: Mar. 14, 1997
[87] PCT Pub. No.: WO95/14164
    PCT Pub. Date: May 26, 1995

[30] Foreign Application Priority Data

Nov. 19, 1993 [GB] United Kingdom ............... 9323873

[51] Int. Cl.⁶ .................................................... F02B 43/00
[52] U.S. Cl. ................................................ 48/144; 123/527
[58] Field of Search ................................. 48/144; 123/527

[56] References Cited

U.S. PATENT DOCUMENTS 4,152,121  5/1979  van der Weide et al. .
5,245,977  9/1993  Chen et al. .

FOREIGN PATENT DOCUMENTS 163343    12/1985  European Pat. Off. .
609104    8/1926   France .
8634567   2/1987   Germany .
41 37 573 5/1993   Germany .
713331    8/1954   United Kingdom .
84/00400  2/1984   WIPO .

OTHER PUBLICATIONS

"Erweiterung Des Einsatzbereiche Des M.A.N.—B&W. Bieselmetors Zum Viertakt–Ga–Ottomter," MTZ Mototechnigche Zeitschrift, V26, No. 2, pp. 51–55, 1985.

*Primary Examiner*—Timothy McMahon
*Attorney, Agent, or Firm*—Larson & Taylor

[57] ABSTRACT

A carburetor (2) to supply a mixture of fuel gas and combustion air to a reciprocating internal combustion engine. The carburetor has a venturi (4) and a throttle (10) including a throttle valve (24). A tear-drop shaped obstruction (36) is mounted in the venturi throat (18) on diametrically opposed radial arms (66). The narrowest part of the tubular gap (46) between the walls of venturi (4) and the obstruction (36) is at gap (48). A continuous slot (50) in the throat wall (18) encircles the obstruction and opens into gap (48). Another continuous slot (70) encircling the obstruction (36) is formed therein and also opens into the gap (48). Fuel gas is supplied to the slots (50 and 70) through passages (52, 74 and 72).

20 Claims, 3 Drawing Sheets

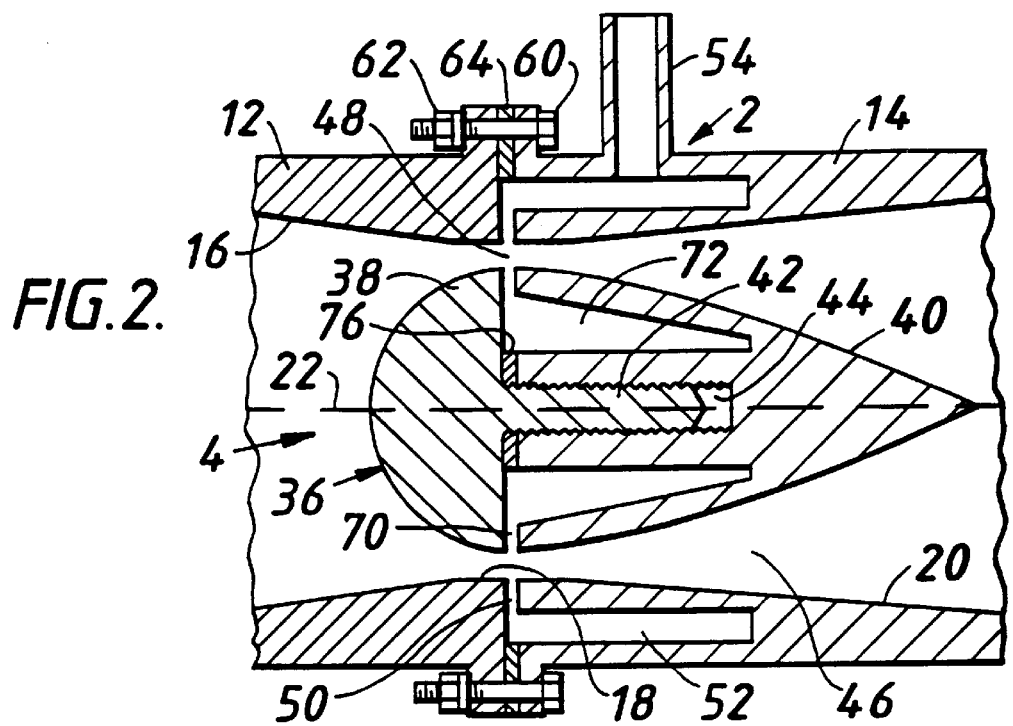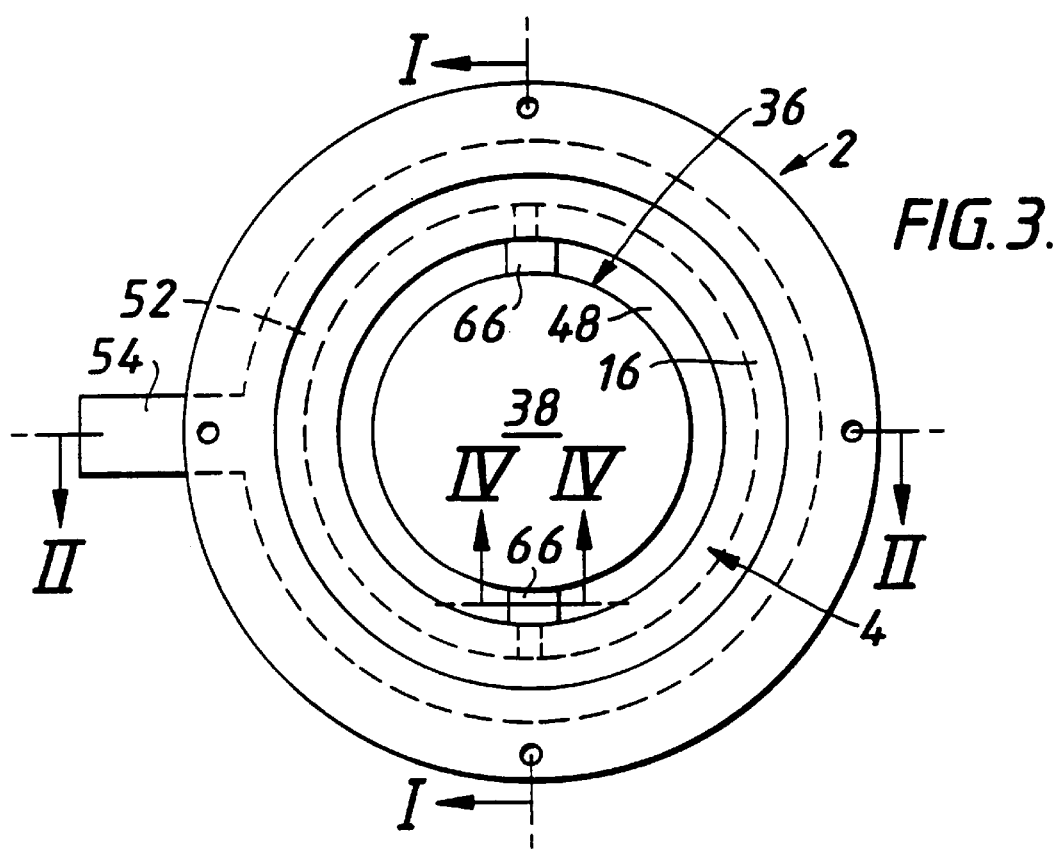

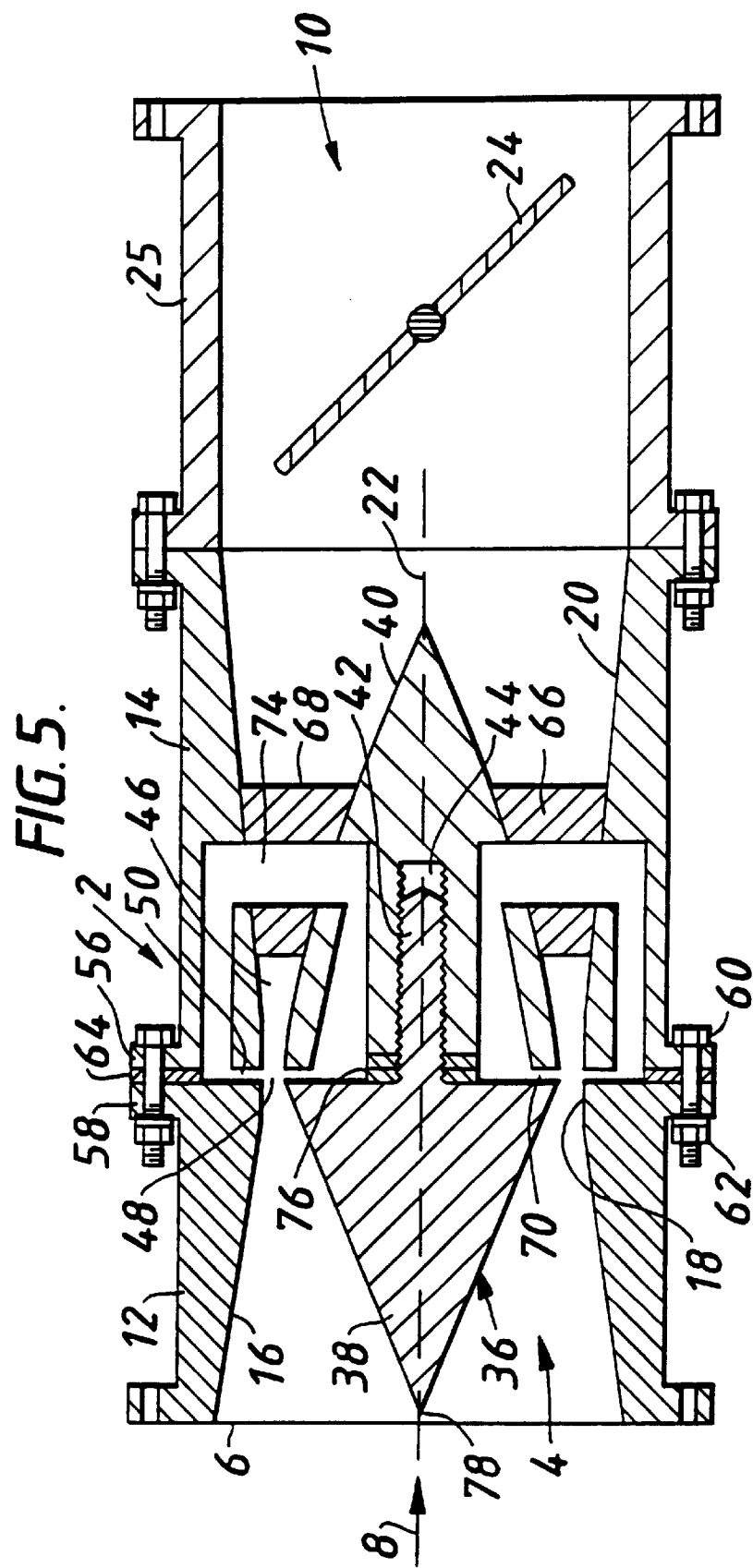

CARBURETOR

This invention concerns a carburettor for the supply of fuel gas to mix with combustion air for the mixture to be supplied to power a reciprocating internal combustion engine.

The engine may be used to provide motive power to drive a vehicle, for example, a land running vehicle, or the engine may be a static engine to drive machinery, for example an electrical power generator. Such a generator may be used in a combined heat and power system (CHP) known per se.

To ensure that a fuel gas, for example natural gas, fuelled reciprocating internal combustion engine installation provides the maximum benefit in terms of maximising the power output and efficiency, with the minimum levels of exhaust emissions, the gas must be mixed with the combustion air to meet the following three criteria simultaneously. The method of gas/air mixing (i) must ensure complete homogeneity, (ii) must provide a minimum flow restriction, and (iii) give a constant air/fuel ratio over the whole operating flow range.

An object of the invention is to provide a carburettor capable of being constructed to give a substantially homogeneous mixture of fuel gas and air, and which carburettor can be constructed to provide a low restriction to flow and give a substantially constant air/fuel gas ratio over the whole operating flow range.

According to the invention there is provided a carburettor for the supply of fuel gas to mix with combustion air for the mixture to be supplied to power a reciprocating internal combustion engine, said carburettor comprising a venturi passage for the flow of combustion air therethrough, an obstruction disposed in the throat and said obstruction being spaced from the wall of said throat by a gap wholly surrounding the obstruction, and slot means in the wall of said venturi passage for fuel to emerge from said slot means into the venturi passage, characterised by the slot means being a first slot opening into said gap at said throat and extending circumferentially along the wall of the throat to substantially surround the obstruction, a second slot opening into said gap at said throat and extending circumferentially along an outer wall of the obstruction and said second slot substantially surrounding said obstruction, and passage means to supply fuel gas to said slots for the gas to emerge from said slots into the throat.

In one embodiment of the carburettor, with respect to the general direction of air flow through the venturi from one end of said venturi to the other, a first portion of the obstruction may be upstream of said second slot and a second portion of the obstruction may be downstream of the second slot, and transversely to said general direction of air flow the first portion of said obstruction may have a cross-sectional area which increase along the general direction of air flow and the second portion of said obstruction may have a cross-sectional area which decreases along the general direction of air flow.

BRIEF DESCRIPTION OF THE DRAWINGS

The invention will now be further described, by way of example, with reference to the accompanying drawings in which:

FIG. 2 is a fragment of a section on line II—II in FIG. 3;

FIG. 3 is a front end view, along the direction of arrow III, of the carburettor in FIG. 1, but FIG. 3 being on an enlarged scale relative to FIG. 2;

FIG. 4 is a section on line IV—IV in FIG. 3, but FIG. 4 being enlarged relative to the scale of. FIG. 3, and FIG. 5 is a longitudinal section similar to FIG. 1 but of a second embodiment of the carburettor formed according to the invention.

In the accompanying drawings like references identify like or corresponding parts.

With reference to FIGS. 1 to 4 a carburettor 2 to supply a mixture of fuel gas, for example natural gas, and air to a reciprocating internal combustion engine (not shown) comprises a venturi 4 having an air inlet end 6 through which combustion air enters to flow in the general direction 8 through the venturi, and a throttle section 10 mounted on the venturi.

Figure 1:
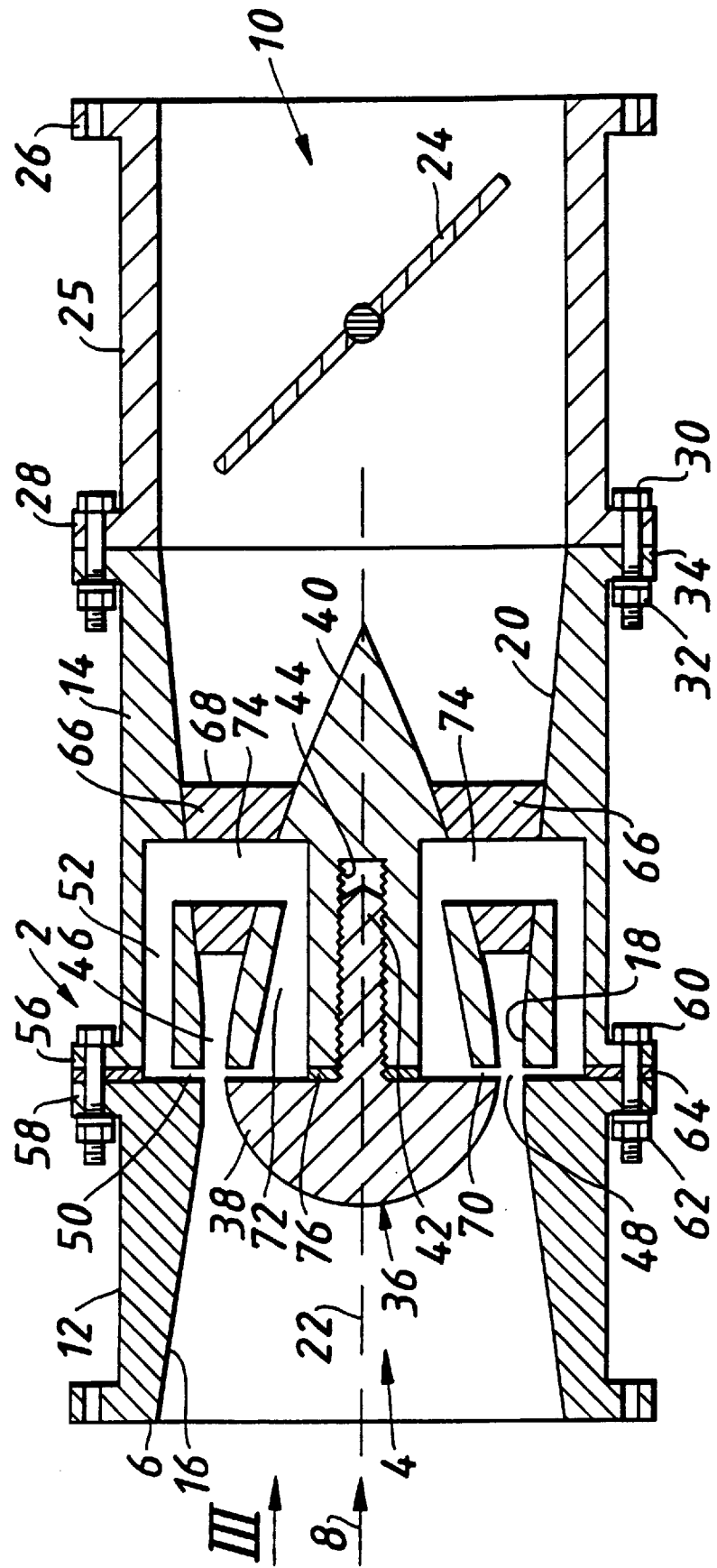
FIG. 1 is a longitudinal section, on line I—I in FIG. 3, of a first embodiment of a carburettor formed according to the invention.

The venturi 4 is provided in two tubular components 12 and 14 and has a convergent venturi portion defined by internal wall 16, a venturi throat defined by internal wall 18, and a divergent venturi portion defined by internal wall 20; said walls 16, 18 and 20 being surfaces of revolution about the venturi axis 22, and the throat 18 being substantially cylindrical.

Throttle section 10 comprises a rotatable throttle valve 24 (known per se) working within a cylindrical tubular portion 25 having external, end mounting flanges 26 and 28 with axial passages to receive securing bolts such as, for example, bolts 30 provided with nuts 32 securing the flange 28 to an external, end mounting flange 34 on the component 14.

A substantially tear-drop shaped obstruction 36 is disposed in the throat 18 and extends at its front end into the convergent portion 16 and at its rear end into the divergent portion 20. The obstruction 36 is substantially a body of revolution about an axis coinciding with the venturi axis 22. At its front or, with respect to air flow direction 8, upstream end the obstruction 36 comprises a segmental spherical portion 38 which in FIGS. 1 to 4 is substantially a hemisphere in shape and thus along the air flow direction increases in cross-sectional area transversely to the direction of air flow. Downstream of the front portion 38, the obstruction 36 comprises a rear portion 40 of substantially conical shape with its apex rearmost, and thus along the air flow direction 8 the rear portion 40 decreases in cross-sectional area transversely to the direction of air flow.

Front portion 38 has a rearwardly extending axial spindle 42 screwed into an axial bore 44 in the rear portion 40 of the obstruction 36.

A tubular gap 46 between the walls 16, 18, 20 of the venturi 4 and the outer wall of the obstruction 36 completely surrounds the obstruction. Gap 46 is narrowest at 48 opposite the rearmost or downstream end of the hemisphere 38. By reason of the shape of the obstruction 36 and the venturi 4, the tubular gap 46 is itself a venturi of annular cross-section having its annular throat at 48.

A narrow slot 50 opens into the throat 48. This slot 50 in the wall of the throat 28 is a continuous, annular slot extending circumferentially along the wall 18 to encircle the obstruction 36. Opening into the slot 50 is a continuous annular passage 52 into which opens a short tubular pipe 54 for connection to a supply of fuel gas. The slot 50 is defined between adjacent end faces of the components 12 and 14 having external, end mounting flanges 56 and 58 with axial passages receiving securing bolts 60 provided with nuts 62 to secure the components 12 and 14 together. Between the flanges 56 and 58 is/are one or more annular distance washers or shims 64 (only one shown in FIGS. 1 and 2), the thickness or number of the shim(s) 64 used determining the axial width of the slot 50.

A pair of diametrically opposed, radially extending arms 66 mounted on the wall 20 support the obstruction 36 in place. As shown in FIG. 4 each arm 66 has a tear-drop shaped cross-sectional shape with the pointed end 68 of the cross-section downstream, relative to the rounded end, with respect to the direction of air flow 8.

Opposite or facing the slot 50 is another narrow slot 70 opening into the throat 48. The slot 70 in the wall of the obstruction 36 is a continuous, annular slot extending circumferentially along the wall of the obstruction to encircle the latter. Opening into the slot 70 is a continuous annular passage 72 in the rear portion 40 of the obstruction 36. Each arm 66 has a through passage 74 opening at one end into the passage 52 and at the other end into the passage 72. The slot 70 is defined between adjacent end faces of the front and rear portions 38 and 40 of the obstruction 36. Between these end faces is/are one or more annular distance washers or shims 76 (only one shown in FIGS. 1 and 2) the thickness or number of the shims 76 used determining the axial width of the slot 70.

In use the pipe 54 can be supplied with fuel gas in any manner known per se, for example the gas reaching the pipe 54 may be supplied at a desired pre-determined pressure from a pressure regulator.

The gas supplied to pipe 54 emerges into the throat 48 through both slots 50 and 70. When the carburettor is being prepared for use, the number and thickness of the shims 64 and 76 used can be selected to ensure that the flow-rate of fuel gas per unit length of slot, from the slot 50 is substantially the same as that from the slot 70.

The incoming air is constrained to flow through the narrow passage 48. Since fuel gas is introduced into the air from both sides of the passage 48 this design can be used to ensure that the momentum of the fuel gas flow is sufficient to convey the gas to the centre of the incoming air column, and thus the chance of the gas permeating throughout the annulus of air in the passage 48 is good. In addition, the use of the narrow annular gap 48 increases the air velocity considerably thereby increasing turbulence as an aid to mixing the fuel gas and air. Accordingly the design of carburettor described above increases the chance of a more homogeneous mixture being produced. The convergent section of the tubular venturi 46 between the walls 16, 18. and the front portion 38 of the obstruction 36 increases the air velocity at the throat 48 so that the amount of entrained fuel gas is directly proportional to the amount of air.

This provides the required air/fuel gas ratio control over a wide air flow range. Also the divergent outlet section of the tubular venturi 46 between the conical portion 40 of the obstruction 36 and the wall 20 enables high pressure recovery to be obtained thus reducing overall pressure losses.

In FIG. 5, the front or upstream portion 38 of the obstruction 36 is of a substantially conical shape with its apex facing oppositely to the direction of air flow 8. Again, in FIG. 5 the obstruction 36 is a body of revolution about an axis coinciding with the axis 22 of the venturi 4.

The reciprocating internal combustion engine supplied with a fuel gas/air mixture may be used to drive a vehicle or to drive an electrical generator which may be part of a CHP system in which heat generated by the internal combustion within the engine is extracted using heat exchange means (known per se) for some useful purpose, for example, space and/or process heating.

We claim:

1. A carburettor for the supply of fuel gas to mix with combustion air for the mixture to be supplied to power a reciprocating internal combustion engine, said carburettor comprising:

a venturi passage for the flow of combustion air therethrough, said venturi passage including a throat;

an obstruction disposed in said throat, said obstruction being spaced from a wall of said throat by a gap wholly surrounding the obstruction;

a first slot opening into said gap at said throat and extending circumferentially along the wall of the throat to substantially surround the obstruction;

a second slot opening into said gap at said throat and extending circumferentially along an outer wall of the obstruction, said second slot substantially surrounding said obstruction;

an adjusting means for variably adjusting a size of said first or second slot; and a passage means to supply fuel gas to said slots for the gas to emerge from said slots into the throat.

2. A carburettor as claimed in claim 1, in which the first slot is continuous.

3. A carburettor as claimed in claim 1, in which the second slot is continuous.

4. A carburettor as claimed in claim 1, in which the first and second slots substantially face one another across said gap.

5. A carburettor as claimed in claim 1 in which said adjusting means variably adjusts a width of the first or the second slot along an axis of the venturi passage.

6. A carburettor as claimed in claim 1 in which said adjusting means comprises spacers or shims for adjustably varying the size of said first or second slot.

7. A carburettor as claimed in any claim 1, in which with respect to a general direction of air flow through the venturi passage from one end of said venturi passage to the other, a first portion of the obstruction is upstream of said second slot and a second portion of the obstruction is downstream of the second slot, and transversely to said general direction of air flow the first portion of said obstruction has a cross-sectional area which increases along the general direction of air flow and the second portion of said obstruction has a cross-sectional area which decreases along the general direction of air flow.

8. A carburettor as claimed in claim 1, in which fuel gas supplied to said carburettor emerges from the first slot at a flow-rate which is substantially equal to the flow-rate at which said gas emerges from the second slot.

9. A carburettor as claimed in claim 1, in which the obstruction is mounted on at least one arm mounted on the venturi passage, and said arm is provided with a passage for the flow of fuel gas to the second slot.

10. A carburettor as claimed in claim 9, in which said arm has an external shape which in cross-section is substantially a tear-drop.

11. A reciprocating internal combustion engine in combination with a carburettor as claimed in claim 1.

12. A combined heat and power system comprising an engine as claimed in claim 11.

13. A vehicle comprising an engine as claimed in claim 11.

14. A carburettor as claimed in claim 1, in which, along an axis of the venturi passage, the venturi passage has walls defining a convergent portion of the venturi passage, the throat, and a divergent portion of the venturi passage, and said walls are surfaces of revolution about the venturi passage axis.

15. A carburettor as claimed in claim 14, in which a first portion of said obstruction extends from said throat into said convergent portion of the venturi passage and a second portion of said obstruction extends from said throat into said divergent portion of the venturi passage.

16. A carburettor as claimed in claim 14, in which said obstruction has an outer surface which is substantially a surface of revolution about the venturi passage axis.

17. A carburettor as claimed in claim 16, in which with respect to a direction of air flow through the venturi passage, a first portion of the obstruction is upstream of said second slot and a second portion of the obstruction is downstream of the second slot, and transversely to the venturi passage axis the first portion of the obstruction has a cross-sectional area which increases along the direction of air flow and the second portion of the obstruction has a cross-sectional area which decreases along the direction of air flow.

18. A carburettor as claimed in claim 17, in which said first portion of the obstruction has an outer surface which is substantially a segment of a sphere having an axis substantially coincident with said venturi passage axis.

19. A carburettor as claimed in claim 17, in which said first portion of the obstruction has an outer surface which is substantially a surface of a cone having a cone axis substantially coincident with said venturi passage axis.

20. A carburettor as claimed in claim 17, in which the second portion of the obstruction has an outer surface which is substantially a surface of a cone having a cone axis substantially coincident with said venturi passage axis.

\* \* \* \* \*